Figure 1:
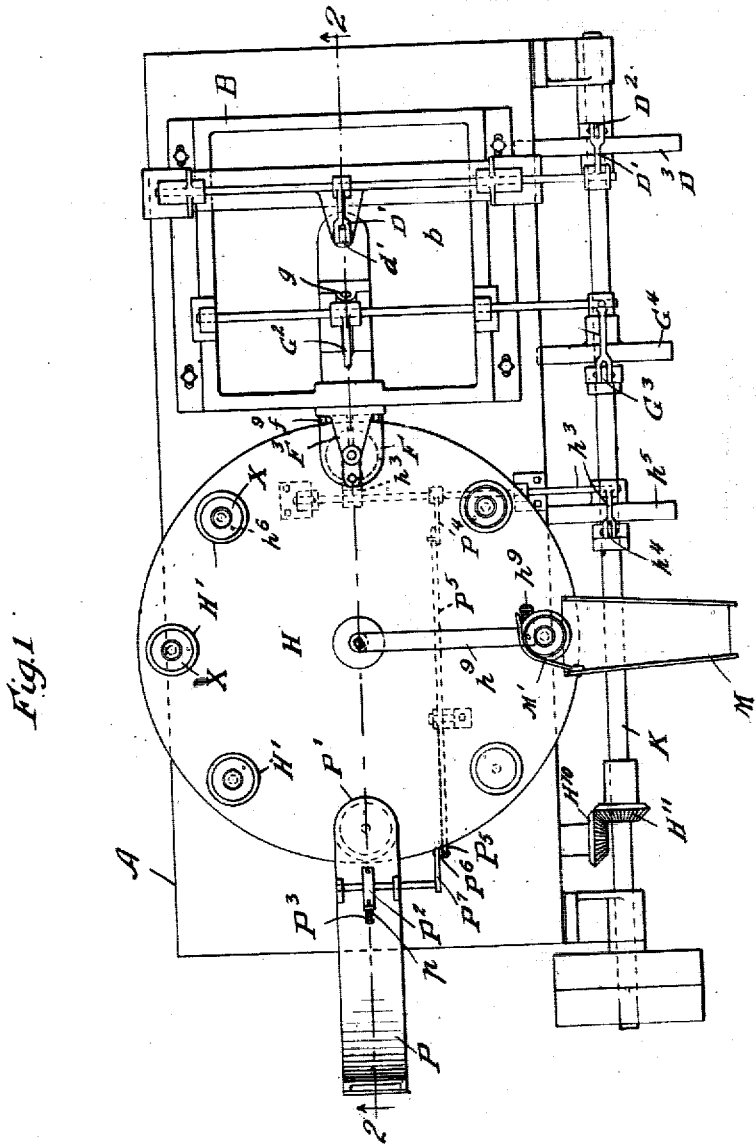

No. 820,358. PATENTED MAY 8, 1906.
J. G. HODGSON.
MACHINE FOR AUTOMATICALLY APPLYING MOLTEN SOLDER TO RIMS OF CAN CAPS.
APPLICATION FILED DEC. 18, 1905.

3 SHEETS—SHEET 1.

Witnesses:
Wm. Geiger
H. W. Munday

Inventor
John G. Hodgson
By Munday Evarts Adcock
Attorney

No. 820,358. PATENTED MAY 8, 1906.
J. G. HODGSON.
MACHINE FOR AUTOMATICALLY APPLYING MOLTEN SOLDER TO RIMS OF CAN CAPS.
APPLICATION FILED DEC. 18, 1905.

3 SHEETS—SHEET 2.

Witnesses:
Wm. Geiger
A. M. Munday

Inventor:
John G. Hodgson
By Munday, Evarts & Adcock.
Attorneys

No. 820,358. PATENTED MAY 8, 1906.
J. G. HODGSON.
MACHINE FOR AUTOMATICALLY APPLYING MOLTEN SOLDER TO RIMS OF CAN CAPS.
APPLICATION FILED DEC. 18, 1905.
3 SHEETS—SHEET 3.
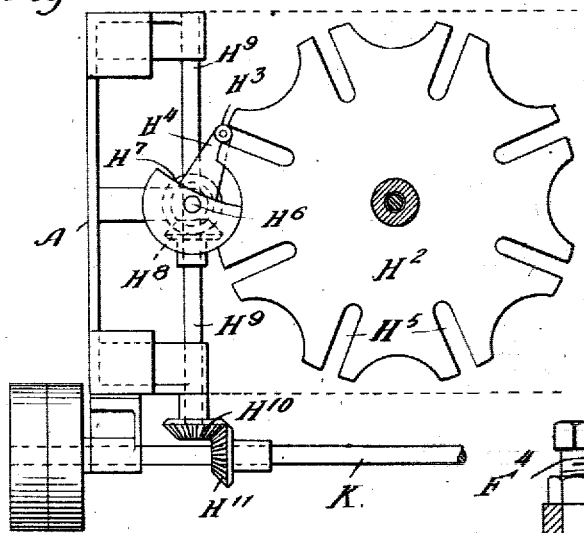
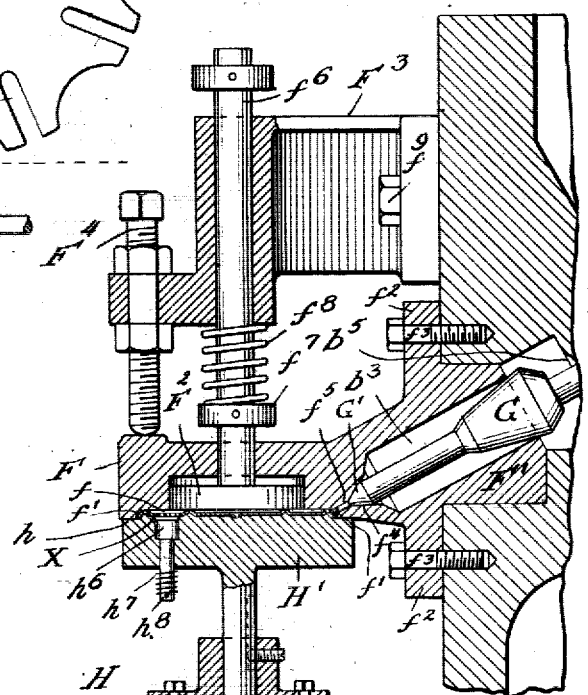
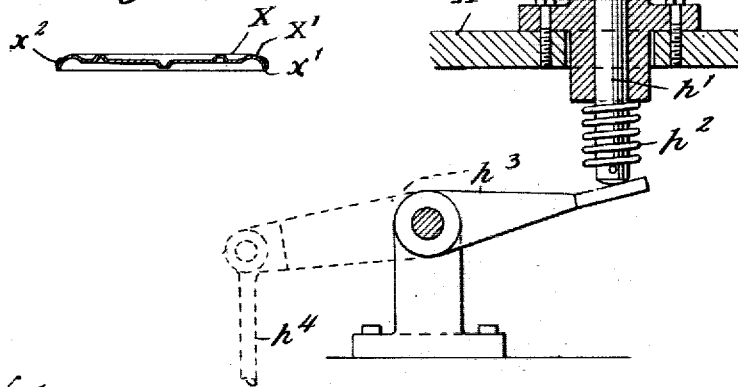
Witnesses:
Wm. Geiger
N. M. Munday.
Inventor:
John G. Hodgson
By Munday Evarts Adcock
Attorneys

UNITED STATES PATENT OFFICE.

JOHN G. HODGSON, OF MAYWOOD, ILLINOIS, ASSIGNOR TO AMERICAN CAN COMPANY, OF NEW YORK, N. Y., A CORPORATION OF NEW JERSEY.

MACHINE FOR AUTOMATICALLY APPLYING MOLTEN SOLDER TO RIMS OF CAN-CAPS.

No. 820,358.     Specification of Letters Patent.     Patented May 8, 1906.

Application filed December 18, 1905. Serial No. 292,245.

*To all whom it may concern:*

Be it known that I, JOHN G. HODGSON, a citizen of the United States, residing in Maywood, in the county of Cook and State of Illinois, have invented a new and useful Improvement in Machines for Automatically Applying Molten Solder to Rims of Can-Caps, of which the following is a specification.

My invention relates to machines for manufacturing solder-edged or solder-charged can-caps for sheet-metal cans, the same being caps for closing the filling-openings in the heads of cans, and which have their rims or soldering-flanges furnished with solder necessary for soldering the caps on the cans; and my invention relates more particularly to machines for manufacturing that kind or class of solder-charged can-caps in which the solder is applied in a molten state to the upper or outside face of the can-cap and fusibly united with the rim-coating thereof, so that the solder will be permanently and securely fixed to the cap.

The object of my invention is to provide an automatic machine of a simple, efficient, and durable construction by means of which molten solder may be rapidly and cheaply applied to the rims of can-caps and fusibly united to the tin coating thereof.

My invention consists in the means I employ to practically accomplish this object or result—that is to say, it consists, in connection with a molten-solder pot or vessel, of a pump or cylinder and piston therein for forcing the molten solder under pressure into a mold and upon the outer face of the rim of the can-cap contained therein, a mold adapted to receive the can-caps in turn, one after another, and provided with an annular recess in connection with the molten solder in the solder pot or vessel and into which the molten solder may be forced under pressure when the can-cap is forced on or against the mold, a choker-valve in the channel or communication connecting the valve with the solder-pot and pump-cylinder therein, a can-cap carrier furnished with a series of movable can-cap holders or plungers, the carrier operating to bring the can-caps and their holders successively in turn into position for registry with the mold, and each can-cap holder or plunger operating to force the can-cap into or against the mold, so that the can-cap itself will close the lower face of the mold when the molten solder is forced by the piston into the mold by the rim of the can-cap, and a can-cap feeder for automatically feeding or delivering the can-caps upon the can-cap holders or plungers of the carrier, so that the operation of applying the molten solder to the rims of the caps may be performed automatically and without hand labor and rapidly and cheaply.

My invention also consists in the novel devices and in the novel combinations of parts and devices herein shown or described.

Figure 2:
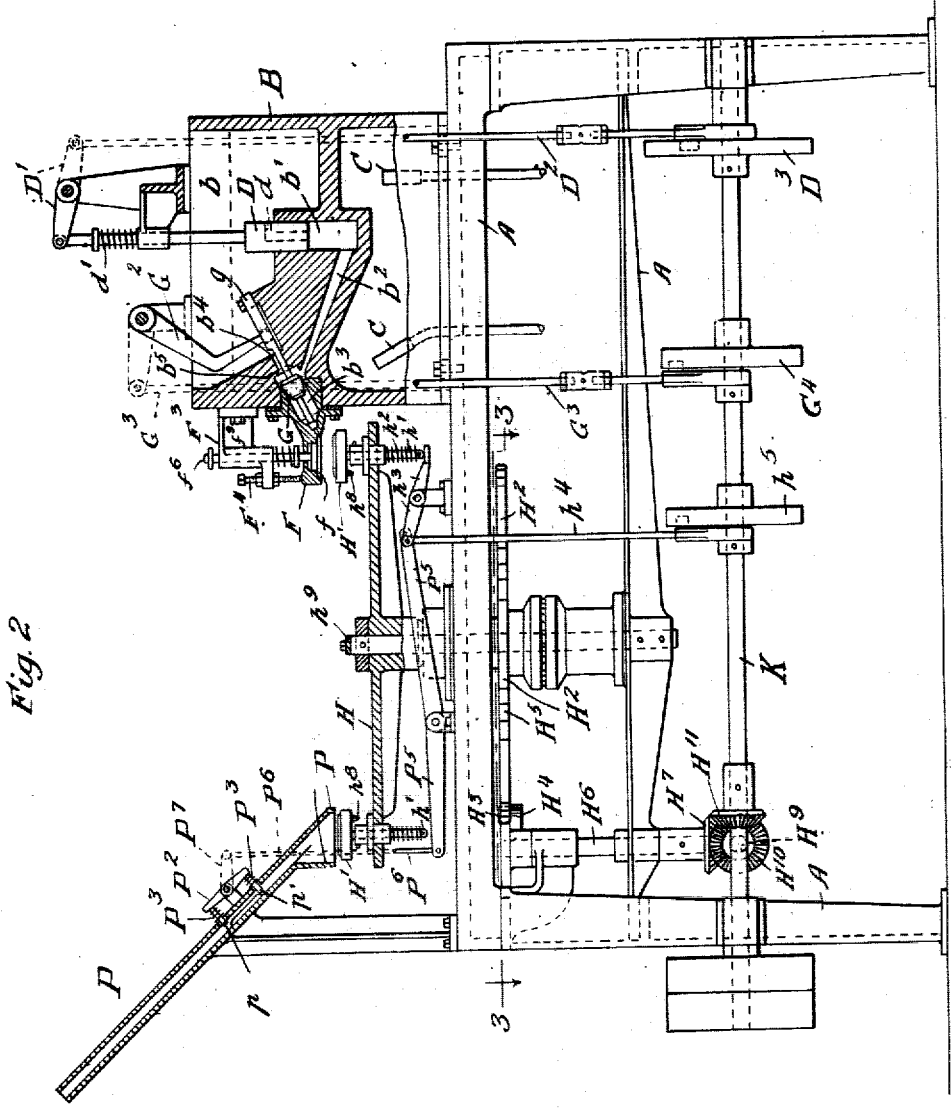

In the accompanying drawings, forming a part of this specification, Figure 1 is a plan view of an automatic machine for applying molten solder to the rims of can-caps embodying my invention. Fig. 2 is an elevation partly in vertical section on line 2 2 of Fig. 1. Fig. 3 is a detail horizontal section on line 3 3 of Fig. 2. Fig. 4 is a detail section of the mold and other coöperating parts, showing the can-cap in position in the mold to receive the charge of molten solder on its rim. Fig. 5 is an enlarged sectional view showing the solder-charged can-cap as manufactured by the machine.

In the drawings, A represents the frame of the machine.

B is the molten-solder pot or vessel, and C represents heaters, preferably gas-burners, for melting and keeping molten the solder therein. The molten-solder pot or vessel B has a solder-chamber $b$, and a piston chamber or cylinder $b'$, in which the pump-piston D reciprocates to force the molten solder through the solder channel or connection $b^2$ and valve-chamber $b^3$ into the mold F, which has on its under side a circular recess or seat $f$ to receive the can-cap X, and an annular recess $f'$ to receive the molten solder upon the upper or outer face $X'$ of the rim $x'$ of the can-cap and form the solder into a solder bead or annulus $x^2$ upon the rim of the cap. The annular solder-recess $f'$ of the mold F is thus in direct communication with the molten solder in the pump cylinder or chamber of the pot or vessel B. The valve-chamber $b^3$ also has a duct or connection $b^4$, connecting with the molten solder in the pot or vessel B, independent of the pump cylinder or piston. The valve-chamber $b^3$ has a valve-seat $b^5$, which is engaged by the reciprocating choker-valve G to close the duct or communication $b^4$, leading from the valve-chamber to the molten solder in the pot or vessel B. The mold F is preferably made in a separate piece from the pot or vessel B and is provided with flanges $f^2$ for securing the same to the pot or vessel by suitable screws or bolts $f^3$. The valve-chamber $b^3$ is preferably formed partly in the pot or vessel B and partly in the piece or part F' of which the mold F is formed. The reciprocating valve-stem $g$, carrying the choker-valve G, is also provided with a discharge-valve G', which engages the valve-seat $f^4$ to close the discharge-orifice $f^5$, leading to the annular solder-receiving recess $f'$ of the mold F.

The mold F is furnished with a cap-ejector $F^2$, having a stem $f^6$, furnished with a collar $f^7$, and a spring $f^8$ for actuating the ejector to discharge the cap from the mold after the solder has been applied to its rim. The ejector $F^2$ or its stem $f^6$ is mounted on a bracket $F^3$, attached to the solder pot or vessel B by a screw $f^9$. The ejector-bracket $F^3$ is furnished with a set-screw $F^4$ to take the strain or thrust of the cap-holder or plunger H' off of the mold F or its supports.

H is an intermittently-moving carrier, preferably a horizontally-rotating turret or wheel, furnished with a series of movable can-cap holders, chucks, or plungers H', each having a seat $h$ to receive a can-cap, the same being preferably shaped to fit and correspond to the lower face of the can-cap. By its intermittent rotary movement the can-cap carrier H brings each of the cap-holders H' and the can-cap thereon into position for registry with the mold F, and then by the upward or reciprocating movement of the cap-holder H' the cap X is moved upward and forced and clamped against the lower face of the mold F, so that the cap X or its rim $x'$ itself forms the lower wall of the annular solder-receiving recess $f'$ of the mold. Each of the cap-holders H' is provided with a stem $h'$ and preferably with a spring $h^2$ to retract the holder. Each of the can-cap holders H' is in turn moved upward or reciprocated, as required, to clamp the can-cap thereon against the mold F, preferably by means of a vibrating lever $h^3$, connecting-link $h^4$, and cam $h^5$ on the cam-shaft K.

The cylinder or chamber of the solder-pump is preferably formed integr with the pot B, as illustrated in the draw gs. The piston D of the pump has a duct or passage $d$ through the same for admission of the solder from the pot B to the chamber or cylinder of the pump. The piston D of the pump or its stem $d'$ is preferably operated or reciprocated, as required, by means of a lever D', connecting-link $D^2$, and cam $D^3$ on the cam-shaft K.

The choker and discharge valves G G' or their stem $g$ is preferably reciprocated or operated, as required, by means of a bent lever $G^2$, connecting-link $G^3$, and cam $G^4$ on the cam-shaft K. The intermittently moving or rotating carrier H is preferably given its step-by-step movement and intermittently locked in position for registry of its can-cap holders in turn, successively, with the mold F by a Geneva stop mechanism $H^2 H^3 H^4$, the rotating arm $H^4$ carrying the pin $H^3$, which engages the slots $H^5$ of the disk $H^2$, the arm $H^4$ being on a shaft $H^6$, having gear $H^7$, meshing with gear $H^8$ on the shaft $H^9$, which has a gear $H^{10}$ meshing with a gear $H^{11}$ on the cam-shaft K.

P is a can-cap feeder, preferably an inclined chute, for automatically delivering the can-caps one by one upon the can-cap holders H' of the carrier H as the carrier intermittently rotates. The feeder P is preferably furnished with a guide P' for directing the cap upon the cap-holder H' below. The feeder P is further preferably furnished with a vibrating escapement $P^2$, having pins or stops $p\ p'$ to release the caps one by one. The escapement $P^2$ is furnished with a spring $P^3$ and is preferably vibrated or operated, as required, by means of the cam $h^5$ on the shaft K, connecting-link $h^4$, arm $P^4$ on lever $h^3$, lever $P^5$, connecting-link $P^6$, arm $P^7$, on lever $P^2$. Each of the can-cap holders H' is preferably furnished with a cap-ejector $h^6$, having a spring $h^7$ for retracting the same. The stem $h^8$ of the cap-ejector $h^6$ engages a stationary projection or cam $h^9$ on the frame, which operates the ejector as the carrier H rotates.

M is the discharge-chute by which the finished caps are discharged from the machine. This discharge-chute is furnished with a curved guard or arm M' for deflecting the caps into the discharge-chute as the carrier rotates.

I claim—

1. In a machine for automatically applying molten solder to the rims of can-caps, the combination with a molten-solder pot or vessel, a pump piston or plunger therein, a valve-chamber having a solder-discharge orifice or nozzle, a discharge-valve, a choker-valve, a mold having a can-cap-receiving recess to receive the molten solder and apply it to the rim of the can-cap, an intermittently-moving carrier, a series of can-cap holders, chucks or plungers mounted on said carrier to force and clamp in turn the can-caps against said mold and a can-cap feeder for delivering the can-caps to said holders on the carriers, substantially as specified.

2. In a machine for applying molten solder upon the rims of can-caps, the combination of a molten-solder pot or vessel, of a mold connecting therewith, means for forcing the molten solder from said pot or vessel into said mold and an intermittently-moving can-cap carrier having a series of movable can holders or chucks mounted thereon to force the can-caps each in turn against said mold, substantially as specified.

3. In a machine for applying molten solder upon the rims of can-caps, the combination of a molten-solder pot or vessel, of a mold connecting therewith, means for forcing the molten solder from said pot or vessel into said mold and an intermittently-moving can-cap carrier having a series of movable cap holders or chucks mounted thereon to force the can-caps each in turn against said mold, and a can-cap feeder for delivering the can-caps upon said holders or chucks of the carrier, substantially as specified.

4. In a machine for automatically applying molten solder to the rims of can-caps, the combination with a molten-solder pot or vessel, of a mold communicating therewith and having on its lower face a can-cap-receiving seat or recess, and provided with an annular solder-receiving recess, a valve-chamber and discharge-valve interposed between said mold and solder pot or vessel, means for forcing the solder from said pot or vessel into said mold and an intermittently-moving can-cap carrier furnished with a plurality of can-cap holders or chucks to force and clamp the can-caps each in turn against said mold, substantially as specified.

5. In a machine for automatically applying molten solder to the rims of can-caps, the combination with a molten-solder pot or vessel, of a mold communicating therewith and having on its lower face a can-cap-receiving seat or recess, and provided with an annular solder-receiving recess, a valve-chamber, a discharge-valve interposed between said mold and solder pot or vessel, means for forcing the solder from said pot or vessel into said mold, and an intermittently-moving can-cap carrier furnished with a plurality of can-cap holders or chucks to force and clamp the can-caps each in turn against said mold, and a can-cap feeder for automatically delivering the can-caps upon said can-cap holders or chucks of the carrier, substantially as specified.

6. In a machine for applying molten solder to the rims of can-caps, the combination with a molten-solder pot or vessel, of a mold immovably connected thereto and in communication with the molten solder in said pot or vessel, means for forcing the molten solder into said mold, a can-cap carrier and a plurality of movable can-cap holders on the carrier arranged to deliver the can-caps successively to the mold, substantially as specified.

7. In a machine for applying molten solder to the rims of can-caps, the combination with a molten-solder pot or vessel, of a mold immovably connected thereto and in communication with the molten solder in said pot or vessel, means for forcing the molten solder into said mold, a can-cap carrier and a plurality of movable can-cap holders on the carrier arranged to deliver the can-caps successively to the mold, and a can-cap-feed chute, substantially as specified.

8. In a machine for applying molten solder to the rims of can-caps, the combination with a molten-solder pot or vessel, of a mold immovably connected thereto and in communication with the molten solder in said pot or vessel, means for forcing the molten solder into said mold, a can-cap carrier and a plurality of movable can-cap holders on the carrier arranged to deliver the can-caps successively to the mold, and a can-cap-feed chute provided with a movable escapement, substantially as specified.

9. In a machine for applying molten solder to the rims of can-caps, the combination with a molten-solder pot or vessel, of a mold immovably connected thereto and in communication with the molten solder in said pot or vessel, means for forcing the molten solder into said mold, a can-cap carrier and a plurality of movable can-cap holders on the carrier arranged to deliver the can-caps successively to the mold, and a can-cap-feed chute provided with a movable escapement, and a guide-ring, substantially as specified.

10. In a machine for automatically applying molten solder to the rims of can-caps, the combination with a stationary mold having a can-cap seat in its under face and an annular recess to receive the solder, of an intermittently-moving carrier having a plurality of movable can-cap holders or chucks to force and clamp the can-caps in turn against said mold, substantially as specified.

11. In a machine for automatically applying molten solder to the rims of can-caps, the combination with a stationary mold having a can-cap seat in its under face and an annular recess to receive the solder, of an intermittently-moving carrier having a plurality of movable can-cap holders or chucks to force and clamp the can-caps in turn against said mold, and a can-cap feeder, substantially as specified.

12. In a machine for automatically applying molten solder to the rims of can-caps, the combination with a stationary mold having a can-cap seat in its under face and an annular recess to receive the solder, of an intermittently-moving carrier having a plurality of movable can-cap holders or chucks to force and clamp the can-caps in turn against said mold, and means for forcing molten solder into said mold, substantially as specified.

13. In a machine for automatically applying molten solder to the rims of can-caps, the combination with a stationary mold having a can-cap seat in its under face and an annular recess to receive the solder, of an intermittently-moving carrier having a plurality of movable can-cap holders or chucks to force and clamp the can-caps in turn against said mold, a molten-solder pot or vessel in communication with said mold, and a piston or plunger for forcing molten solder from the solder-pot into said mold upon the rim of the can-cap, substantially as specified.

14. In a machine for automatically applying molten solder to the rims of can-caps, the combination with a stationary mold having a can-cap seat in its under face and an annular recess to receive the solder, of an intermittently-moving carrier having a plurality of movable can-cap holders or chucks to force and clamp the can-caps in turn against said mold, a molten-solder pot or vessel in communication with said mold, and a piston or plunger for forcing molten solder from the solder-pot into said mold upon the rim of the can-cap, and a valve-chamber and a discharge-valve, substantially as specified.

15. In a machine for automatically applying molten solder to the rims of can-caps, the combination with a stationary mold having a can-cap seat in its under face and an annular recess to receive the solder, of an intermittently-moving carrier having a plurality of movable can-cap holders or chucks to force and clamp the can-caps in turn against said mold, a molten-solder pot or vessel in communication with said mold, and a piston or plunger for forcing molten solder from the solder-pot into said mold upon the rim of the can-cap, and a valve-chamber, a discharge-valve, and a choker-valve, substantially as specified.

16. In a machine for automatically applying molten solder to the rims of can-caps, the combination with a stationary mold having a can-cap seat in its under face and an annular recess to receive the solder, of an intermittently-moving carrier having a plurality of movable can-cap holders or chucks to force and clamp the can-caps in turn against said mold, a molten-solder pot or vessel in communication with said mold, and a piston or plunger for forcing molten solder from the solder-pot into said mold upon the rim of the can-cap, and a valve-chamber and a choker-valve, substantially as specified.

17. In a machine for automatically applying molten solder to the rims of can-caps, the combination with a stationary mold having a can-cap seat in its under face and an annular recess to receive the solder, of an intermittently-moving carrier having a plurality of movable can-cap holders or chucks to force and clamp the can-caps in turn against said mold, a molten-solder pot or vessel in communication with said mold, and a piston or plunger for forcing molten solder from the solder-pot into said mold upon the rim of the can-cap, and a can-cap feeder, substantially as specified.

JOHN G. HODGSON.

Witnesses:
PEARL ABRAMS,
H. M. MUNDAY.